No. 895,825. PATENTED AUG. 11, 1908.
J. L. WOODBRIDGE.
SYSTEM OF ELECTRICAL DISTRIBUTION.
APPLICATION FILED JAN. 3, 1908.
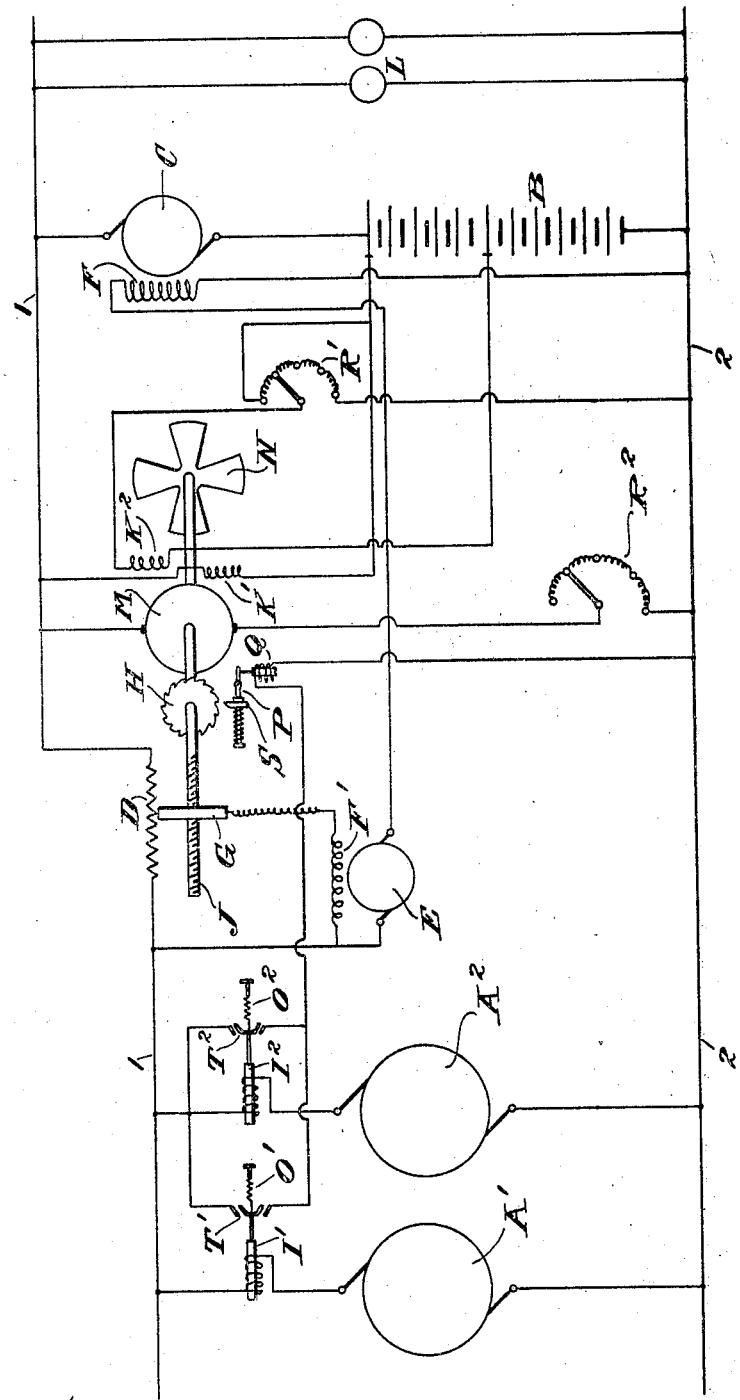
WITNESSES:
INVENTOR.
Joseph L. Woodbridge
BY
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 895,825.          Specification of Letters Patent.       Patented Aug. 11, 1908.

Application filed January 3, 1908. Serial No. 409,174.

*To all whom it may concern:*

Be it known that I, JOSEPH LESTER WOODBRIDGE, a citizen of the United States, residing at Philadelphia, in the county of Philadelphia and State of Pennsylvania, have invented a certain new and useful Sytem of Electrical Distribution, of which the following is a specification.

My invention relates to those systems of electrical distribution in which a storage battery is employed to compensate for load fluctuations, and is particularly applicable to systems in which apparatus is provided for gradually varying the average load on the generators to follow the average demand of the translating devices so as to avoid continuous charge or discharge of the battery with changes in average load. In such a system the apparatus above described would act to throw continually increasing load on the generators with an increase in the average demand without regard to the capacity of the generators to handle such increase, possibly resulting in an excessive overload on the generators. To avoid this possibility I provide means for preventing the controlling apparatus from continuing to throw increased load on the generators after the load of these machines has reached a certain predetermined maximum. This and other objects will be more clearly seen by reference to the following description taken in connection with the accompanying drawing diagrammatically illustrating a system of distribution embodying features of the invention.

In the drawing $A^1$ and $A^2$, are the generators supplying current to the circuit 1, 2. A storage battery B, with its suitably driven booster C is connected across the circuit 1, 2, and the field F of the booster is controlled by the counter-electro-motive force exciter E. The exciter E, is connected in series with the field F, the two being connected directly across the circuit 1, 2, and so long as the electro-motive-force of the exciter E, is equal and opposite to that of the circuit 1, 2, no current will flow in the field winding F. The electro-motive-force of the exciter E, is controlled by its field winding $F^1$, which is connected across a variable portion of a shunt D, in series with conductor 1. The current in the field winding $F^1$ will, therefore be proportional to the current in the shunt D, and therefore, proportional to the combined output of the generators $A^1$ and $A^2$. When this output has a certain critical value the current in the field $F^1$, will be sufficient to produce an electro-motive-force in the exciter E, equal to that across the circuit 1, 2, and no current will flow through the field F, of the booster. Slight variations of output from the generator $A^1$ and $A^2$, above and below this critical value will vary the electro-motive-force of the exciter E, causing current to flow in the field F, in one direction or the other according to whether the load on the generators is increased or diminished, and the effect of this current will be to cause the battery to charge and discharge to compensate for fluctuations of load which may occur, as for example at L.

The critical value of the output from the generators $A^1$ and $A^2$ may be varied by varying the portion of the shunt D across which the field $F^1$ is connected. In the diagram this variation is produced by moving a sliding contact G along the shunt D so as to make contact with it at various points. This contact piece G is mounted on a screw J, driven by a motor M. The armature of the motor M, is connected across circuit 1, 2, with a rheostat $R^2$, in series whereby a practically constant current is transmitted through this armature. The field excitation of the motor M, is the resultant effect of two field windings $K^1$ and $K^2$. The winding $K^1$, is connected between the conductor 1, and the corresponding battery terminal. When the battery and circuit 1, 2, are of the same potential, as is normally the case when the battery is neither charging nor discharging, there will be no current in the field $K^1$. If, however the battery begins to discharge by reason of the operation of its booster C, the battery voltage will fall below that of the circuit 1, 2, and current will flow through the field $K^1$. This will excite the field in the direction to operate the motor so as to move the contact piece G toward the left, thus cutting out a portion of the shunt D. A greater output will be required from the generators $A^1$ and $A^2$ to produce the requisite voltage in the exciter E and the result will be an increase in output from the generators which will relieve the battery from a portion of its discharge. By proper design of the apparatus the effect above described may be made to take place very slowly, so that the change in load on the generators will be gradual. The second field $K^2$ on the motor M, is connected between the middle point of the battery and a rheostat $R^1$, which latter is connected across the battery terminals. By this means the current in the field K² may be varied from zero to a certain maximum in either direction. This field winding K² may therefore be used to balance the field winding K¹ with any desired difference of voltage between the battery and the circuit 1, 2, thus providing means for producing a net average charge or discharge of the battery, as well as a balance between the charge and discharge. On the shaft of the motor M, is shown a ratchet wheel H. A pawl S, carried on a pivoted arm P, is arranged to engage the teeth of the ratchet wheel, when the opposite end of the arm P, is drawn down by the electro-magnet Q. This electro-magnet is energized by relays in the generator circuits. These relays consist of electro-magnets I¹ and I², opposed by adjustable springs O¹ and O² and operating contacts T¹ and T². The electro-magnets I¹ and I², are energized by coils in the corresponding generator leads, so that when the load on either generator reaches a predetermined amount, the contact will be made and the coil of the electro-magnet Q, will be connected across the circuit 1, 2, thus moving the arm P so that the pawl S, will engage with the teeth of the ratchet wheel H. This will prevent the motor M, from turning in the direction to cut out additional portions of the shunt D, but will leave it free to turn in the opposite direction in case the load at L, should fall off and the battery begin to charge. The pawl S, on the arm P, as here shown is cushioned by a spring to prevent it from stopping the motor M too suddenly. A fan N, is mounted on the shaft of the motor to prevent it from reaching an excessive speed.

The system shown on the diagram and described above, therefore, provides storage battery controlling apparatus adapted to throw momentary fluctuations of load on the battery while at the same time the slower changes of the average load are gradually transferred to the generators up to a point where these are giving a certain predetermined output when further transfer of load to these machines is prevented.

What I claim is:

1. A system of electrical distribution provided with an automatic regulating apparatus responsive to rapid fluctuations from any average load and also to sustain changes constituting different average loads, and including a storage battery operatively arranged to receive rapid fluctuations, a generator operatively arranged to receive the sustained changes, and means for limiting the described action of the regulating apparatus to prevent overloading the generators, substantially as described.

2. In combination, an electric circuit and its source, a storage battery operatively arranged to deliver and receive energy to and from the circuit, electro-responsive means for controlling the charge and discharge of the battery, other slower acting automatic means adapted to counteract the effects of the first, and means for checking the operation of the last named means when the output from the source reaches a predetermined value.

3. In combination an electric circuit and its source, a storage battery operatively arranged to deliver and receive energy to and from the circuit, means responsive to departures from a certain electrical condition of the circuit and adapted to control the battery charge and discharge, slower acting means responsive to changes of battery condition and adapted to counteract the effects of the first named means, and means responsive to load on the source for controlling the slower acting means.

4. In combination, an electric circuit and its load, a generator and a storage battery operatively arranged with respect to the circuit, apparatus for controlling the division of load between the generator and the battery, and means for checking the operation of the controlling apparatus to prevent further transfer of load to the generator after the load on said generator reaches a certain value.

5. In combination an electric circuit and its load, a generator and a storage battery operatively arranged with respect to the circuit, apparatus for controlling the division of load between the generator and the battery and adapted automatically to transfer load from battery to generator, and means for preventing such transfer after the load on the generator reaches a certain value.

6. In combination an electric circuit and its source, a storage battery in operative relation to the circuit, controlling apparatus including an appropriate field coil for causing the battery to charge and discharge, connections from the field coil to the circuit, a counter-electro-motive-force exciter connected in series between the field coil and the circuit, means for exciting the fields of the exciter by current proportion to the load on the source, and means responsive to changes of battery condition for varying said proportion.

7. In combination an electric circuit and its source, a storage battery in operative relation to the circuit, controlling apparatus including an appropriate field coil for causing the battery to charge and discharge, connections from the field coil to the circuit, a counter-electro-motive-force exciter connected in series between the field coil and the circuit, means for exciting the fields of the exciter by current proportional to the load on the source, and automatic means for varying said proportion.

8. In combination an electric circuit and its source, a storage battery in operative relation to the circuit, controlling apparatus including a booster and its field coil for causing the battery to charge and discharge, connections from the booster field coil to the circuit, a counter-electro-motive-force exciter connected in series between the booster field coil and the circuit, a field coil on the exciter connected across a shunt in the circuit, a movable contact for varying the resistance of the shunt, a motor for moving said contact, and means responsive to changes of battery condition for operating said motor.

9. In combination an electric generator and a storage battery connected in parallel relation, battery controlling apparatus including a device adapted to increase and decrease the generator output by varying the battery current, a motor for operating said device, and means to prevent the motor from operating to increase the generator output after said output exceeds a certain limit.

10. In combination an electric generator and a storage battery connected in parallel relation, battery controlling apparatus including a device adapted to increase and decrease the generator output by varying the battery current, a motor for operating said device, and means to prevent the motor from operating in the direction to increase the generator output after said output exceeds a certain value while permitting it to operate in the opposite direction.

11. In combination an electric circuit and its source, a storage battery operatively arranged to deliver and receive energy to and from the circuit, electro-responsive means for controlling the charge and discharge of the battery, other slower acting automatic means adapted to counteract the effects of the first, and a device for permitting the slower acting means to operate in only one direction when the output from the source is on one side of a certain value.

In testimony whereof I have hereunto signed my name.

JOSEPH LESTER WOODBRIDGE.

In presence of—
WILLIAM J. JACKSON,
FRANK E. FRENCH.